Dec. 9, 1941.  B. W. KING  2,265,647
PORTABLE INSTRUMENT FOR DETERMINING THE MEAN LEVEL OF WATER
Filed July 29, 1938  4 Sheets-Sheet 1
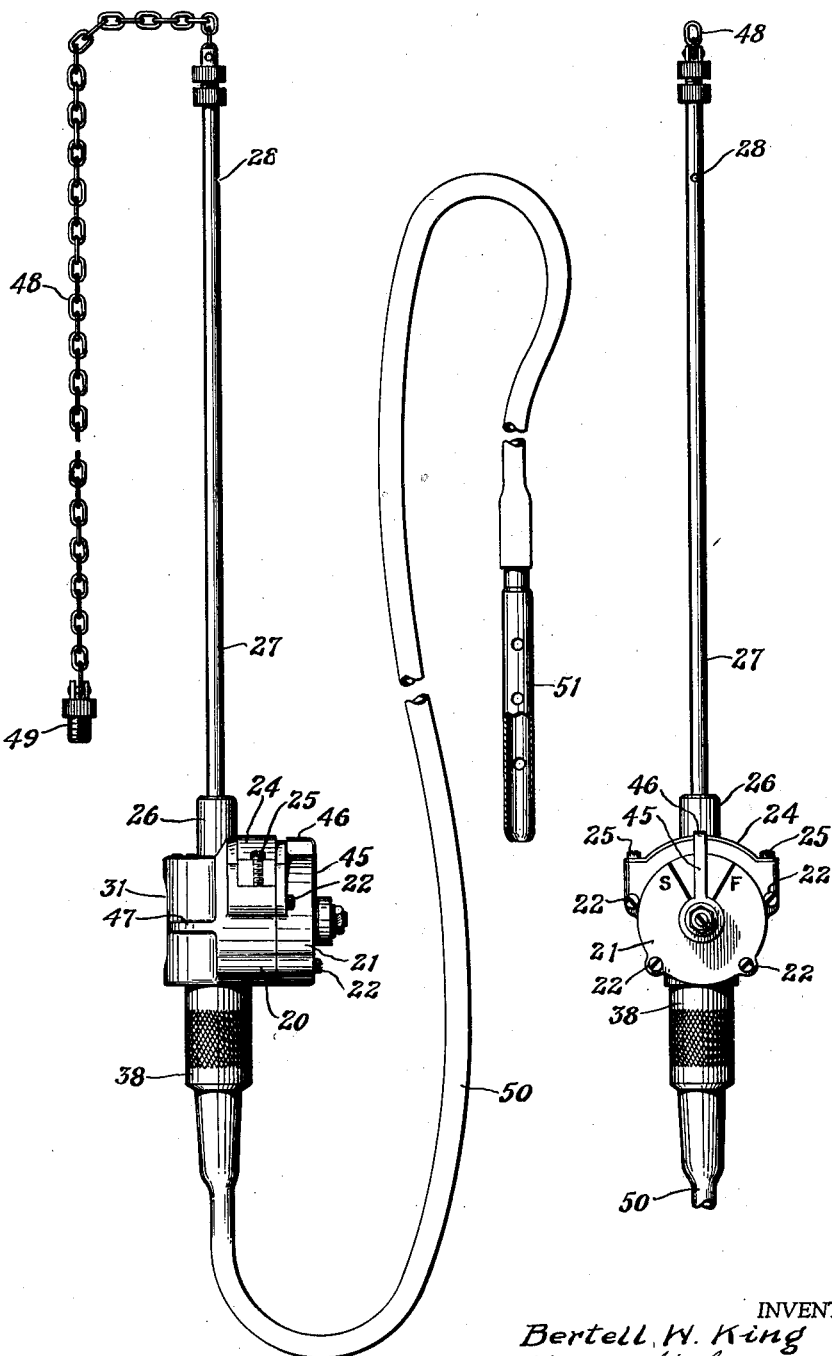
INVENTOR.
Bertell W. King
BY Marshall & Hawley
ATTORNEYS

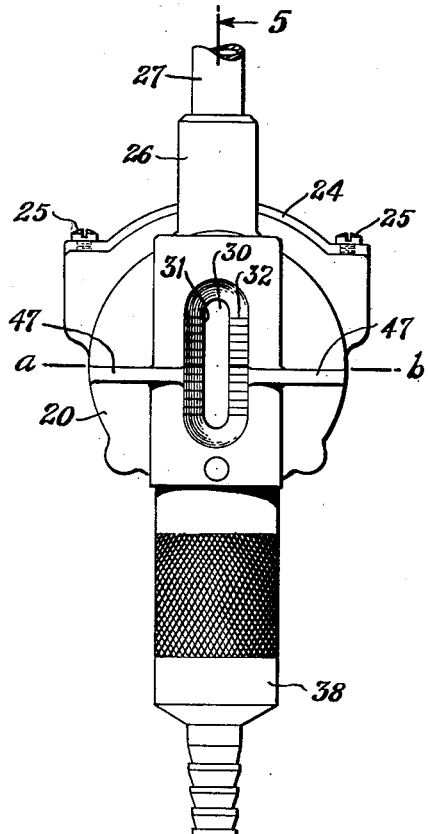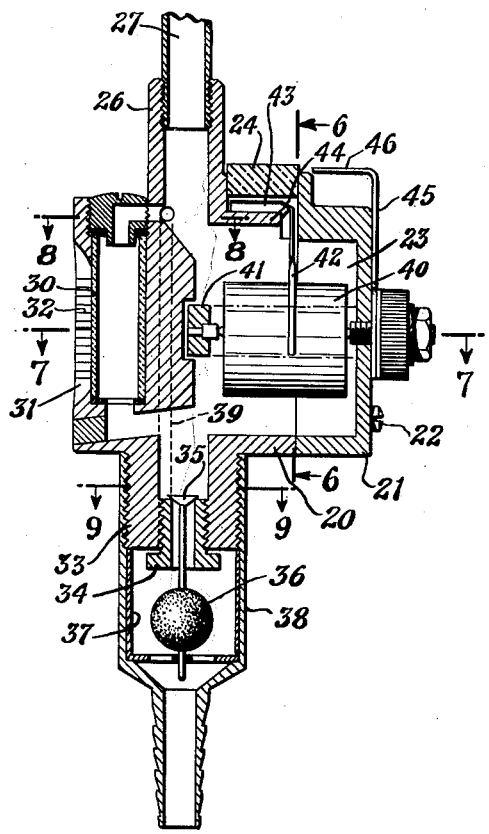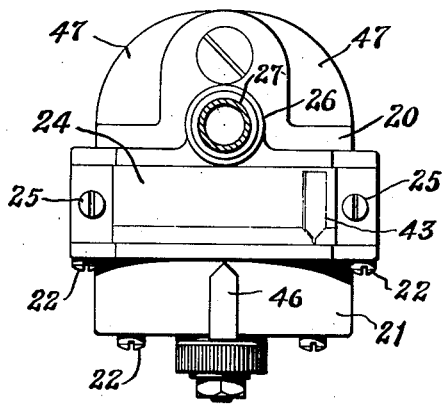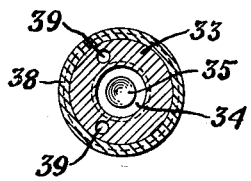

Dec. 9, 1941.  B. W. KING  2,265,647
PORTABLE INSTRUMENT FOR DETERMINING THE MEAN LEVEL OF WATER
Filed July 29, 1938  4 Sheets-Sheet 3

Fig. 10-A

INVENTOR.
Bertell W. King
BY
Marshall & Hawley
ATTORNEYS

Dec. 9, 1941.       B. W. KING       2,265,647
PORTABLE INSTRUMENT FOR DETERMINING THE MEAN LEVEL OF WATER
Filed July 29, 1938       4 Sheets-Sheet 4
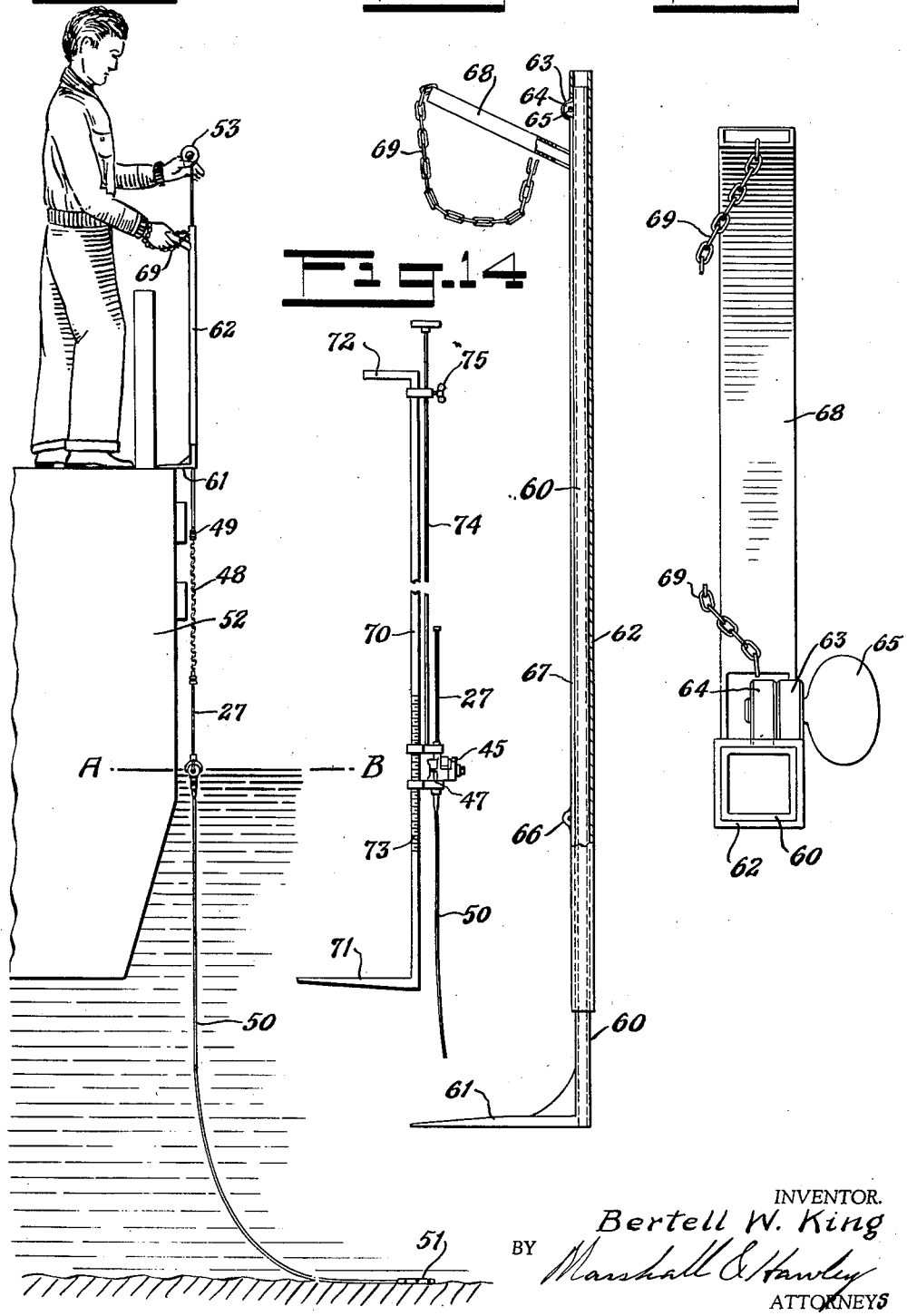
INVENTOR.
Bertell W. King
BY Marshall E. Hawley
ATTORNEYS

Patented Dec. 9, 1941

2,265,647

UNITED STATES PATENT OFFICE 2,265,647

PORTABLE INSTRUMENT FOR DETERMINING THE MEAN LEVEL OF WATER

Bertell W. King, Brooklyn, N. Y.

Application July 29, 1938, Serial No. 221,896

19 Claims. (Cl. 73—290)

This invention relates to improvements in portable instruments for determining the mean level of water.

Its object is to provide an instrument for indicating accurately the mean level of water in which a vessel is floating, for the purpose of getting vertical measurements from such water level to a desired point on the vessel.

The weight of a load on a barge or other vessel can be computed by measuring the difference of its displacement when loaded and when unloaded, or the weight of additions to or removals from its load can be computed similarly. As a basis for computations made for this purpose it is necessary to find the level of the water in relation to the vessel.

The specific purpose of this invention is to provide a simple instrument which can be moved up and down from a vessel readily and which will clearly indicate a point in such movement where a definite part of the instrument is at the level of the water.

Another object is to provide an arrangement for preventing surface movements of the water from affecting the operation of the instrument.

These and other objects of the invention will appear from the following specification in which I will describe the invention, the novel features of which will be pointed out in appended claims.

Referring to the drawings,

Fig. 1 is a side elevation of an instrument which embodies my invention;

Fig. 2 is a front elevation of the instrument shown in Fig. 1;

Fig. 3 is a rear elevation on a larger scale of the instrument shown in the preceding figures;

Fig. 4 is a plan view of the parts shown in Fig. 3;

Fig. 5 is a sectional side elevation of the same parts, the section being taken on the line 5—5 of Fig. 3;

Figure 6:
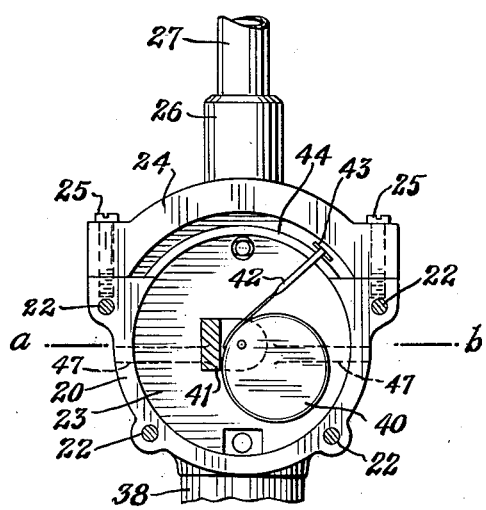
Fig. 6 is a front elevation of the same instrument with its cover plate removed.
Figure 7:
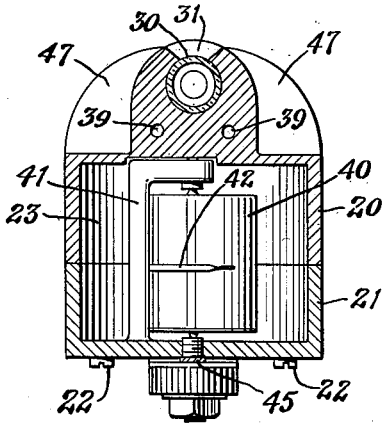
Figure 8:
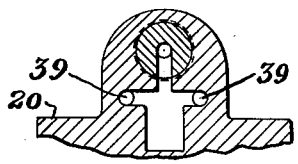
Figure 10:
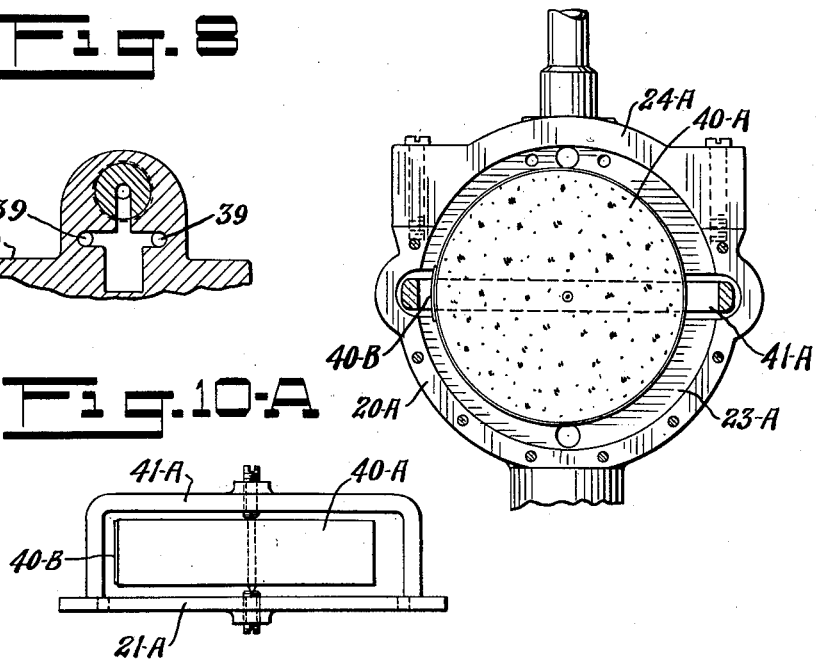

Figs. 7, 8 and 9 are sectional plan views taken on the lines 7—7, 8—8 and 9—9, respectively, of Fig. 5;

Fig. 10 is a front elevation of another device which embodies this invention, with its cover removed and with the float supporting arms shown in section;

Fig. 10A is a plan view of the cover of the device shown in Fig. 10 and of the parts supported thereby;

Fig. 11 is an elevation partly in section of a telescopic stand which is to be used with or as a part of the instrument;

Fig. 12 is a plan view on a larger scale of the stand shown in Fig. 11;

Fig. 13 is an elevation of a part of a barge and of the instrument in use; and

Fig. 14 is an elevation of another arrangement for using the device.

In Figs. 1–9, 20 designates the body of the instrument and 21 its cover affixed to the body by screws 22. These form a water chamber 23, closed at the top by a transparent arcuate cap 24 affixed to the body by screws 25. The top of the water chamber is open through a tubular boss 26 into which is screwed a pipe 27 which has a vent 28 at a point considerably above the water chamber.

In the rear of the body 20 is a water glass 30 in open communication with the top and bottom of the water chamber and visible through an opening 31, the vertical sides of which are beveled and provided with graduations 32, (Fig. 3).

The lower end of the body 20 is in the form of an internally and externally threaded boss 33, (Fig. 5). Into it is screwed a thimble 34, the upper end of which forms a seat for a check valve 35 on a stem which carries a float 36. The lower end of the stem is guided by a bushing 37 which abuts against the lower end of the boss 33 and which is held in place by a shell 38 screwed onto the outside of the boss 33. 39, 39 are vents which communicate with the top of the water chamber and through the boss 33 with the space within the bushing 37 and shell 38 under the check valve 35. These are shown in Figs. 5, 7 and 8.

40 is a cylindrical float in the water chamber, eccentrically pivoted to the rear surface of the cover 21 and to a post 41 extending rearwardly from the cover. A light arm 42 projects tangentially from a point on the float near its pivot. The upper end of this arm 42 is bent inwardly and widened to form a pointed vane 43 which is movable in a space between a semi-cylindrical part 44 of the body and its arcuate cap 24.

45 is an arm pivoted on the cover coaxially with the pivot of the float. It is bent inwardly as at 46 toward the cap 24 and its end pointed to form a water density indicator. This arm is secured against accidental displacement, but may be moved manually about its pivotal support toward the marks S or F, (Fig. 2), or to any intermediate position.

Horizontal flanges 47 are provided on the body 20, the upper surfaces of which are level with the axis of the float 40. 48 is a chain attached to the upper end of the pipe 27, and 49 is an attaching device at the end of the chain at an exact predetermined distance from the top of the flanges 47.

A flexible tube 50 of considerable length is attached to the lower end of the shell 38. At its free end is a hollow perforated metallic intake nozzle 51 of sufficient weight to draw the tube 50 downwardly when it is submerged in water.

60 is a hollow square tube having a foot-piece 61 extending at right angles from its lower end. 62 is a casing surrounding the tube 60 within which the tube has a sliding fit. A lug 63 projects rearwardly from this outer casing 62 near its upper end. 64 is a lug projecting from the tube 60 and secured to lug 63 by a set screw 65. 66 is another lug projecting from a lower part of casing 62 which may be moved up to the lug 64 and secured thereto, thereby practically doubling the length of this telescopic stand and enabling an operator who may have to stand on a cargo on the deck of the barge 52 to place the foot-piece 61 on the deck of the barge. The casing 62 is slotted as at 67 to clear the lug 64. A handle 68 projects rearwardly from the upper part of the outer casing 62. 69 is a wrist chain with its ends secured to the handle 68.

Before specifically describing the modifications illustrated by Figs. 10, 10A and 14, I will describe the operation of this device.

In Fig. 13, 52 designates a barge. A tape measure 53 is run through the tube 60 and its end secured to the upper end of the pipe 27 by the chain 48. The foot-piece 61 is placed on the deck of the barge with the tube 60 overhanging the edge of the barge. The flexible tube 50 will be submerged and the operator will move the instrument up and down until the top of the flanges 47 are in line with the water level A—B.

Water will enter the tube 50 and lift the check valve 35. The water may then flow into or out of the water chamber 23, according to the elevation of the instrument. This will raise the float 40 and cause it to rotate and move its pointer 43.

The tube 50 is of sufficient length to extend below any surface agitation of the water so that the water in chamber 23 will be at mean or average level of the water which supports the barge.

The density of the water is first determined by a hydrometer reading and the indicator 46 set accordingly. The operator moves the instrument up and down until the top of the flanges 47 are exactly even with the mean of the water level A—B. The level of the water in the water chamber 23 will then be on the line a—b (Fig. 6), exactly through the center of the pivots for the float 40. The amount of rotation imparted to the float will be dependent upon the density of the water. The indicator 46 has been set to correspond to this density and when the water level a—b corresponds to the water level A—B, the float pointer 43 will be in line with the density indicator 46. The chain 48 and tape 53 tend to hang vertically and the operator will move the tube 60 into alinement with them, thus assuring further accuracy.

A reading on the tape 43 at the top of tube 60 is then taken from which and the known dimensions of the barge, the distance from the bottom of the barge to the water level A—B and the displacement of the barge may be computed, as the distance from the flanges 47 to the tape securing device 49 and the length of the tube 60 are fixed known factors.

In practice, several measurements are taken from different parts of the barge when it is in one load condition and similar measurements taken again when it is in a different load condition. Obviously, the different displacements computed from these different sets of measurements will give the difference of weight on the barge.

As a further check and to enable greater accuracy of the measurements, the arrangement which will now be described is provided. Upon completion of the operation thus far described the operator lifts the instrument somewhat rapidly. This will immediately close the check valve 35 and the water in the water chamber 23 will be entrapped. Then when the instrument is raised to the operator's eye level, the height of the water in the water chamber and the tube 30 can be seen and checked by the graduations 32. To remove the water, the instrument may be turned upside down and the water will run out through the pipe 27 and its vent 28, the vents 39 providing for the entry of air through the tube 50.

In this simple manner, extremely accurate measurements may be obtained.

In Figs. 10 and 10A the casing is designated by 20A, its cover, water chamber and arcuate cap by 21A, 23A and 24A, respectively. A larger circular float 40A is pivoted to the center of the cover and to a yoke 41A extending rearwardly therefrom. These pivots are slightly eccentric to the float, however, so that the admission of water to chamber 23A will cause the float to rotate.

The periphery of the float is at all times visible through the cap 24A and the amount of its rotation may be observed by the position of a transverse indicator 40B on it. The operation of this instrument is obviously similar to that already described.

Another way of using the instrument is shown in Fig. 14. A rod 70 is provided with an arm 71 extending at right angles from its lower end, and a handle 72 at its upper end. A part of this rod is graduated, as shown at 73. The instrument is secured to a second rod 74 which is slidably mounted on the rod 70 and which may be secured to it by a clamping device 75. The arm 71 is held in contact with the bottom of the barge and the rod 74 moved up and down until it indicates the water level. Then it is clamped to the rod 70. The distance between the arm 71 and the flanges 47 is obviously the draft of the vessel.

Several structural modifications and ways of using this device have been illustrated and described in order to show that the invention is not limited to any particular construction, and I intend no limitations other than those imposed by the following claims.

What I claim is:

1. A portable instrument for determining the mean level of water, comprising a casing forming a water chamber, a vent pipe connected with the top of the chamber, an elongated tube connected with the bottom of the chamber, a float actuated check valve near the connection of the tube with the water chamber arranged to entrap water in the chamber, and means actuated by water admitted to the chamber through the tube when the instrument is dipped into water for indicating the position of the instrument in relation to the mean level of the water.

2. A portable instrument for determining the mean level of water, comprising a casing forming a water chamber, a vent pipe connected with the top of the chamber, an elongated tube connected with the bottom of the chamber, said casing being constructed to form a duct around the chamber interconnecting the vent pipe and the tube, a float actuated check valve near the connection of the tube with the chamber, arranged to entrap water in the chamber, and means actuated by water admitted to the chamber when the instrument is dipped into water for indicating the position of the instrument in relation to the mean level of the water.

3. A portable instrument for determining the mean level of water, comprising a casing forming a water chamber, having a thin arcuate upper wall, a transparent arcuate top for the casing spaced from said wall, and eccentrically pivoted float in the chamber, a visual indicator mechanically actuated by the rotative movement of the float about its pivot, having a part movable in the space between the upper wall of the chamber and the transparent top of the casing, and a density indicator supported by the casing arranged to be set manually into cooperative relation with said part of the visual indicator.

4. A portable instrument for determining the mean level of water, comprising a casing forming a water chamber, an eccentrically pivoted float in the chamber, a water inlet at the base of said chamber, a water gauge glass on the side of the casing connected with the chamber, a float actuated check valve in said water inlet arranged to entrap water admitted to the chamber through said inlet, and a visual indicator mechanically actuated by the movement of the float.

5. A portable instrument for determining the water line of a vessel, comprising a casing forming a water chamber, a vent pipe connected with the top of the chamber, an elongated tube connected with the bottom of the chamber and a visual indicating float in the chamber actuated by water admitted to the chamber through the tube when the instrument is dipped into the water supporting the vessel, combined with means for moving said instrument vertically in relation to a fixed point on such a vessel and determining the distance of the instrument from said fixed point when a desired part of the instrument is at the mean level of the water supporting the vessel.

6. A portable instrument for determining the water line of a vessel, comprising a casing forming a water chamber, a transparent top for the casing, a movable float in the chamber and a visual indicator under said top mechanically actuated by the movement of the float, combined with means for moving said instrument vertically in relation to a fixed point on the vessel into the water supporting the vessel and for determining the distance of the instrument from said fixed point when a desired part of the instrument is at the mean level of the water supporting the vessel.

7. A portable instrument for determining the water line of a vessel, comprising a casing forming a water chamber, a transparent top for the casing, a movable float in the chamber, a visual indicator mechanically actuated by the movement of the float, a part of said indicator being disposed under said transparent top and a density indicator arranged to be set manually into cooperative relation with said part of the visual indicator, combined with means for moving said instrument vertically in relation to a fixed point on a vessel into the water supporting the vessel and for determining the distance of the instrument from said fixed point when a desired part of the instrument is at the mean level of the water supporting the vessel.

8. A portable instrument for determining the water line of a vessel, comprising a casing forming a water chamber, a vent pipe connected with the top of the chamber, an elongated tube connected with the bottom of the chamber, and a visual indicating float actuated by water admitted to the chamber when the instrument is dipped into the water supporting the vessel to indicate the level of the water in the chamber, combined with means for moving the instrument vertically in relation to a fixed point on a vessel into the water supporting the vessel and for determining the distance of the instrument from said fixed point when a desired part of the instrument is at the mean level of the water supporting the vessel, and means for entrapping the water in the chamber when the instrument is withdrawn from the water supporting the vessel.

9. A portable instrument for determining the water line of a vessel, comprising a casing forming a water chamber, a water inlet at the base of the water chamber, a float actuated check valve in said water inlet arranged to entrap water admitted to the chamber through said inlet and a visual float actuated by water in the chamber for indicating the level of the water in the chamber, combined with means for moving said instrument vertically in relation to a fixed point on a vessel into the water supporting the vessel and for determining the distance of the instrument from said fixed point when a desired part of the instrument is at the mean level of the water supporting the vessel.

10. A portable instrument for determining the water line of a vessel, comprising a casing forming a water chamber, a water inlet at the base of the chamber, a float actuated check valve in said water inlet arranged to entrap water admitted to the chamber through said inlet, a movable float in the water chamber and a visual indicator mechanically actuated by the movement of the float, combined with means for moving the instrument vertically in relation to a fixed point on a vessel into the water supporting the vessel and for determining the distance of the instrument from said fixed point when a desired part of the instrument is at the mean level of the water supporting the vessel.

11. A portable instrument for determining the water line of a vessel, comprising a casing forming a water chamber, having a thin arcuate upper wall, a transparent arcuate top for the casing spaced from said wall, an eccentrically pivoted float in the chamber, a visual indicator mechanically actuated by the rotative movement of the float about its pivot, having a part movable in the space between the upper wall of the water chamber and the transparent top of the casing and a density indicator supported by the casing arranged to be set manually into cooperative relation with said movable part of the visual indicator, combined with means for moving said instrument vertically in relation to a fixed point on a vessel into the water supporting the vessel and for determining the distance of said instrument from said fixed point when a desired part of the instrument is at the mean level of the water supporting the vessel.

12. A portable instrument for determining the water line of a vessel, a flexible support for the instrument arranged to vertically adjust said instrument to the mean level of the water supporting the vessel, a device having a member arranged to engage a fixed part of such vessel and a straight rigid portion movable into vertical alinement with said flexible support and means for measuring the distance from a point on the instrument to a point on said device.

13. A portable instrument for determining the water line of a vessel, said instrument having a flat horizontal flange, a flexible support for the instrument arranged to vertically adjust said instrument to bring its flange to the mean level of the water supporting the vessel, a device having a member arranged to engage a fixed part of such vessel and a straight rigid portion movable into vertical alinement with said flexible support and means for measuring the distance from the flange on the instrument to a point on said device.

14. A portable instrument for determining the mean water line of a vessel, comprising a casing forming a water chamber, means for admitting water to said chamber when the instrument is moved vertically into the water supporting the vessel, a water gauge communicating with said chamber, a visual indicator for showing when the water in the chamber is at the mean level of the water supporting the vessel and means for entrapping the water in the chamber when the instrument is withdrawn from the water supporting the vessel, combined with a flexible support for the instrument arranged to vertically adjust said instrument to the mean level of the water supporting the vessel, a device having a member arranged to engage a fixed part of such vessel and a straight rigid portion movable into vertical alinement with said flexible support and means for measuring the distance from a point on the instrument to a point on said device.

15. A portable instrument for determining the mean water line of a vessel, comprising a casing forming a water chamber, means for admitting water to said chamber when the instrument is moved vertically into the water supporting the vessel, said means comprising an elongated tube connected with the chamber, a water gauge communicating with said chamber, a visual indicator for showing when the water in the chamber is at the mean level of the water supporting the vessel and means for entrapping the water in the chamber when the instrument is withdrawn from the water supporting the vessel, combined with a flexible support for the instrument arranged to vertically adjust said instrument to the mean level of the water supporting the vessel, a device having a member arranged to engage a fixed part of such vessel and a straight rigid portion movable into vertical alinement with said flexible support and means for measuring the distance from a point on the instrument to a point on said device.

16. A portable instrument for determining the water line of a vessel, comprising a casing forming a water chamber, a vent pipe connected with the top of the chamber, an elongated tube connected with the bottom of the chamber, said casing being constructed to form a duct around the chamber interconnecting the vent pipe and the tube, a water gauge glass on a side of the casing connected with the chamber, means actuated by water admitted to the chamber when the instrument is dipped into the water supporting the vessel for indicating the position of the instrument in relation to the mean level of the water supporting the vessel, a float actuated check valve near the connection of the tube with the chamber arranged to entrap water in the chamber when the instrument is withdrawn from the water supporting the vessel, combined with a flexible support for the instrument arranged to vertically adjust said instrument to the mean level of the water supporting the vessel, a device having a member arranged to engage a fixed part of such vessel and a straight rigid portion movable into vertical alinement with said flexible support and means for measuring the distance from a point on the instrument to a point on said device.

17. An instrument for determining the mean level of water, comprising a portable casing, means for suspending the casing and varying its elevation in relation to the water, said casing forming a water chamber, a transparent top for the casing, a movable float in the chamber, a visual indicator mechanically actuated by the movement of the float, a part of the indicator being disposed under said transparent top and a density indicator arranged to be set manually into cooperative relation with said part of the visual indicator.

18. An instrument for determining the mean level of water, comprising a portable casing, means for suspending the casing and varying its elevation in relation to the water, said casing forming a water chamber, a float in the chamber, a water inlet at the base of the chamber, said float being actuated by the water admitted to the chamber through said inlet to indicate the elevation of the casing in relation to the mean level of the water.

19. An instrument for determining the mean level of water, comprising a portable casing, means for suspending the casing and varying its elevation in relation to the water, said casing forming a water chamber, a float in the chamber, a water inlet at the base of the chamber, a float actuated check valve in said inlet arranged to entrap water to the chamber through said inlet and the float being actuated by said water to indicate the elevation of the casing in relation to the mean level of the water.

BERTELL W. KING.